(12) United States Patent
Sasaki

(10) Patent No.: US 7,449,815 B2
(45) Date of Patent: Nov. 11, 2008

(54) ACTUATOR

(75) Inventor: Ryota Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/503,183

(22) Filed: Aug. 14, 2006

(65) Prior Publication Data
US 2007/0036533 A1   Feb. 15, 2007

(30) Foreign Application Priority Data
Aug. 15, 2005   (JP)   ............ P2005-235320

(51) Int. Cl.
*H02N 2/00*   (2006.01)
(52) U.S. Cl. .............. 310/323.09; 310/328
(58) Field of Classification Search ......... 310/323.09, 310/328, 343, 307
See application file for complete search history.

(56) References Cited
U.S. PATENT DOCUMENTS
5,847,488 A   12/1998   Yoshida et al.

6,194,811 B1   2/2001   Shinke et al.
2005/0035687 A1*   2/2005   Xu et al. ............ 310/328
2006/0061236 A1*   3/2006   Naka et al. .......... 310/328
2006/0125350 A1*   6/2006   Audren et al. ....... 310/328

FOREIGN PATENT DOCUMENTS
EP   0 464 764 A1   8/1992
EP   0 823 738 A2   11/1998
JP   2633066 B2   4/1997

* cited by examiner

Primary Examiner—Thomas M Dougherty
(74) Attorney, Agent, or Firm—Birch, Stewart, Kolasch & Birch, LLP

(57) ABSTRACT

An actuator comprises: an electro-mechanical conversion element; a driving frictional member mounted onto one side in an extension/contraction direction of the electro-mechanical conversion element; a driven member frictionally engaged with the driving frictional member; an urging section that urges the driven member to frictionally engage the driven member with the driving frictional member; and an urging force adjusting section that adjusts an urging force of the urging section.

11 Claims, 8 Drawing Sheets

ACTUATOR

BACKGROUND OF THE INVENTION

1. Field of the Invention

The present invention relates to an actuator, and particularly relates to an actuator that is installed in a digital camera, mobile phone, or other compact precision apparatus and drives a zoom lens.

2. Description of the Related Art

As a driving device for a lens unit of a digital camera, etc., an actuator that employs a piezoelectric element is used. For example, with an actuator of Japanese Patent No. 2633066, a driving shaft is affixed to one side of a piezoelectric element, and the other side of the piezoelectric element is fixed to a main device body. A lens barrel is slidably supported on the driving shaft, and the lens barrel is frictionally engaged with the driving shaft by making use of an urging force of a plate spring. Drive pulses of substantially sawtooth-like waveform are applied to the piezoelectric element, and the piezoelectric element deforms at different speeds in an extension direction and a contraction direction. For example, when the piezoelectric element gradually deforms, the lens barrel moves along with the driving shaft. Oppositely, when the piezoelectric element rapidly deforms, the lens barrel stays at the same position due to its mass inertia. Thus, by repeatedly applying drive pulses of substantially sawtooth-like waveform to the piezoelectric element, the lens barrel can be moved intermittently at a fine pitch.

However, with the actuator of Japanese Patent No. 2633066, because the moving distance, moving speed, and thrust of the driven member vary according to the position of the driven member and the operating environment, stable drive control cannot be performed.

SUMMARY OF THE INVENTION

The present invention has been made in view of the above circumstances, and an object thereof is to provide an actuator that can perform stable drive control regardless of the position of the driven member and the operating environment.

To achieve the above object, according to a first aspect of the invention, there is provided an actuator comprising: an electro-mechanical conversion element; a driving frictional member mounted onto one side in an extension/contraction direction of the electro-mechanical conversion element; a driven member frictionally engaged with the driving frictional member; an urging section that urges the driven member to frictionally engage the driven member with the driving frictional member; and an urging force adjusting section that adjusts an urging force of the urging section.

With the first aspect of the invention, because the urging force can be adjusted by the urging force adjusting section, the driven member and the driving frictional member can be engaged at an appropriate frictional force. The driven member can thus be driven over a fixed moving distance at a fixed moving speed and thrust, and stable drive control can be performed.

A second aspect of the invention provides the actuator according to the first aspect of the invention, further comprising: a position detecting section that detects a position of the driven member; and a controlling section that controls the urging force adjusting section based on a detection value of the position detecting section.

With the second aspect of the invention, because the urging force of the urging section can be adjusted according to the position of the driven member, stable drive control can be constantly performed regardless of the position of the driven member.

A third aspect of the invention provides the actuator according to the first aspect of the invention, further comprising: an operating environment measuring section that measures an operating environment; and a controlling section that controls the urging force adjusting section based on measurement values of the operating environment measuring section.

With the third aspect of the invention, because the urging force of the urging section can be adjusted according to the operating environment (for example, the temperature, humidity, atmospheric pressure, etc.), stable drive control can be constantly performed regardless of the operating environment.

A fourth aspect of the invention provides the actuator according to any one of the first to third aspects of the invention, wherein the urging section is a plate spring comprising a shape memory alloy, and the urging force adjusting section is a heating device that passes an electric current through the plate spring to heat the plate spring. With the fourth aspect of the invention, the shape of the plate spring can be changed by heating the plate spring, and the urging force can thereby be adjusted.

A fifth aspect of the invention provides the actuator according to any one of the first to fourth aspects of the invention, wherein a holding frame of a zoom lens is mounted onto the driven member.

DETAILED DESCRIPTION OF THE INVENTION

Preferred embodiments of an actuator according to the present invention shall now be described in detail with reference to the attached drawings.

Figure 1:
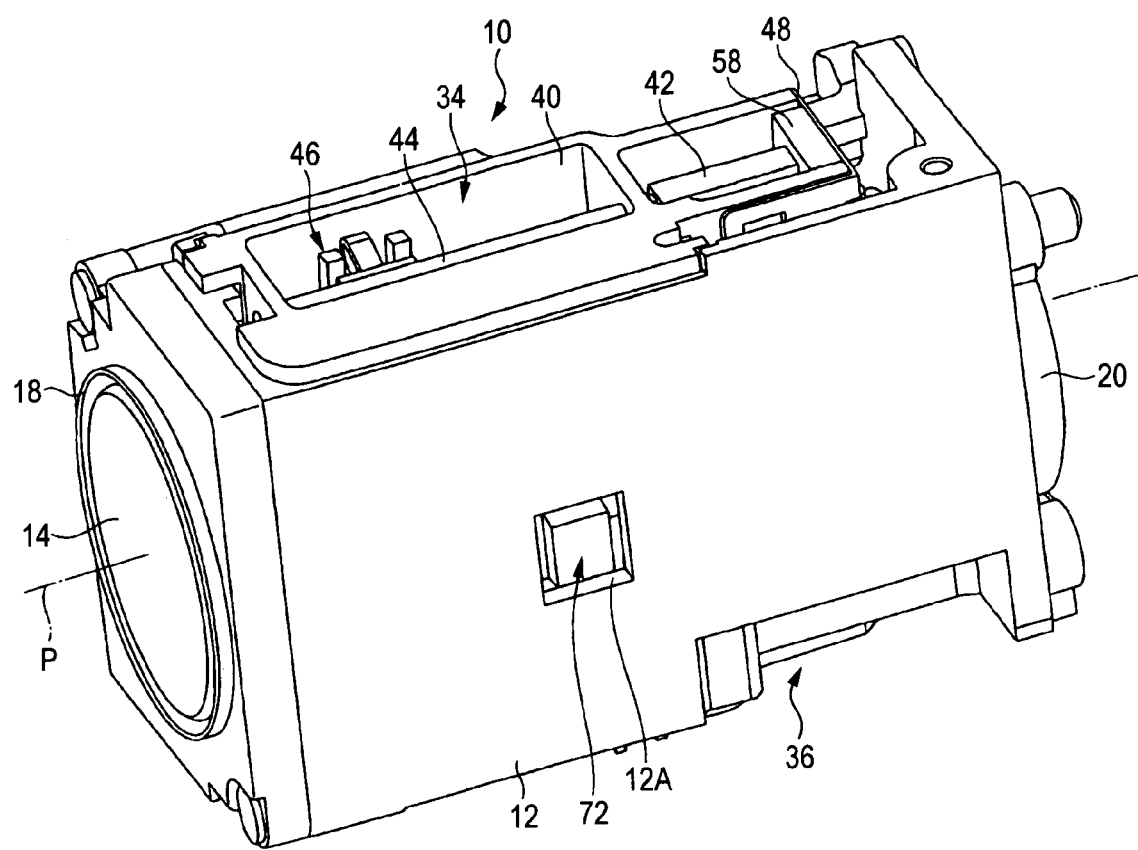
FIG. 1 is a perspective view of a lens device to which an actuator according to the present invention is applied.
Figure 2:
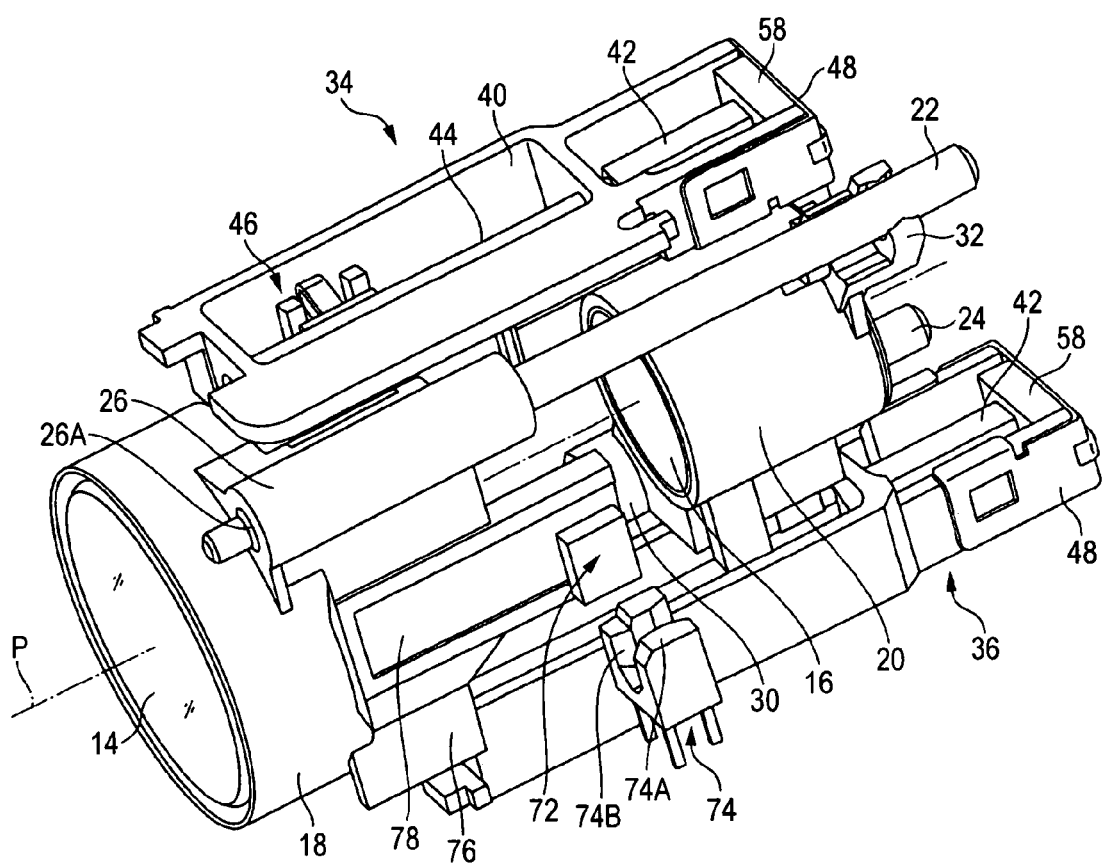
FIG. 2 is a perspective view of an internal arrangement of the lens device of FIG. 1.
Figure 3:
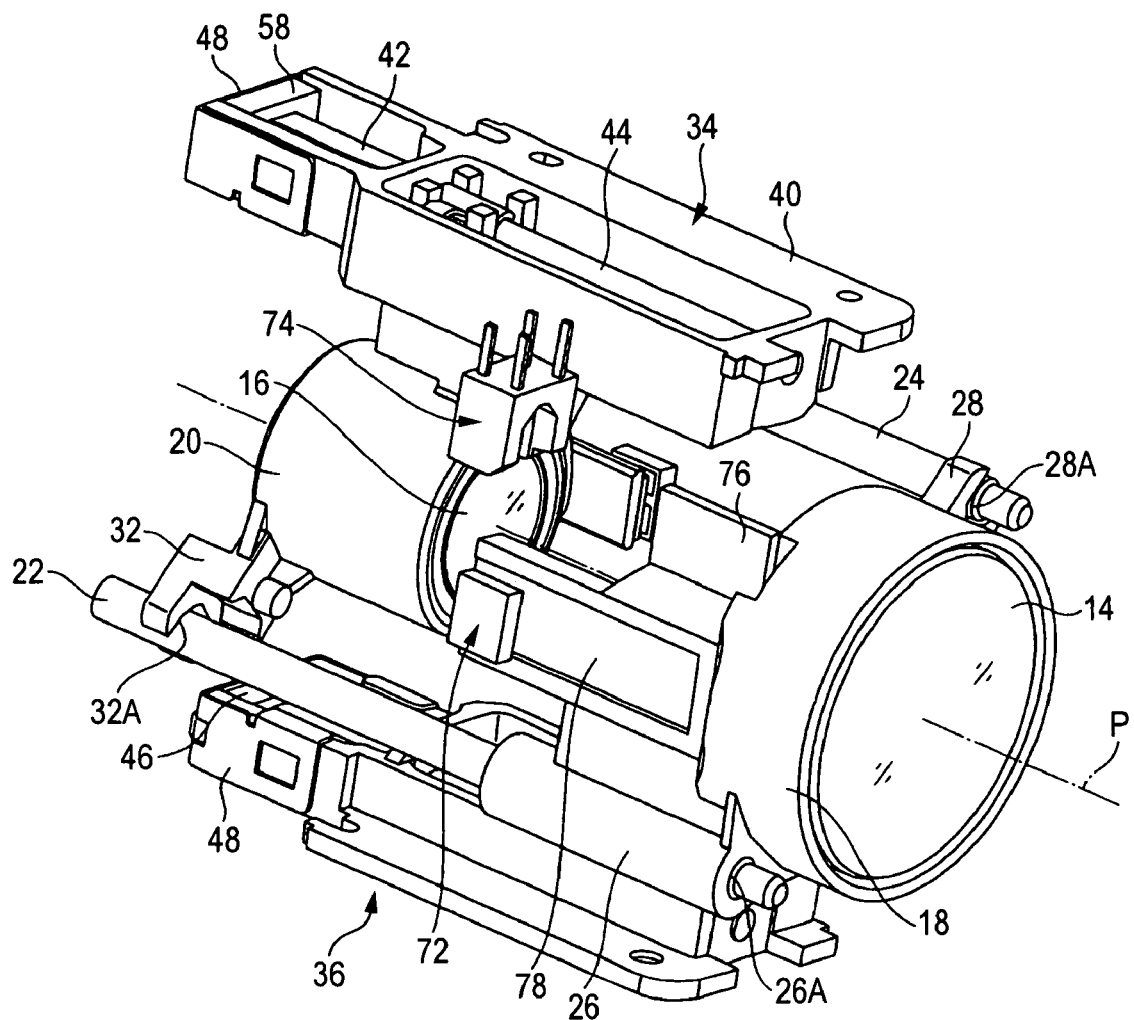
FIG. 3 is a perspective view of the lens device as viewed from a different direction as FIG. 2.

FIG. 1 is a perspective view of a lens device 10 to which an actuator according to the present invention is applied, and FIGS. 2 and 3 are perspective views of an internal arrangement of this device.

As shown in FIG. 1, the lens device 10 has a main body 12, formed to a substantially rectangular shape, and has zoom lenses (groups) 14 and 16 in the interior of the main body 12 as shown in FIGS. 2 and 3. Of the zoom lenses (groups) 14 and 16, one is a variator lens and the other is a compensator lens. The zoom lenses (groups) 14 and 16 are respectively held in holding frames 18 and 20, and these holding frames 18 and 20 are supported by two guide shafts 22 and 24 in a manner enabling sliding along an optical axis P direction. The two guide shafts 22 and 24 are disposed in parallel to the optical axis P at diagonal positions inside the main body 12 and are fixed to the main body 12.

The holding frame 18 has a guide portion 26, having an insertion hole 26A through which the guide shaft 22 is inserted, and an engaging portion 28, having a U-shaped groove 28A that is engaged with the guide shaft 24. The holding frame 18 is thereby guided by the two guide shafts 22 and 24, and the zoom lens (group) 14 is supported in a manner enabling movement along the optical axis P direction. Likewise, the holding frame 20 of the zoom lens 16 has a guide portion 30, having an insertion hole (not shown) through which the guide shaft 24 is inserted, and an engaging portion 32, having a U-shaped groove 32A, with which the guide shaft 22 is engaged. The holding frame 20 is thereby guided by the two guide shafts 22 and 24, and the zoom lens (group) 16 is supported in a manner enabling movement along the optical axis P direction.

The zoom lenses (groups) 14 and 16 are driven along the optical axis P direction by means of actuators 34 and 36, respectively. The actuators 34 and 36 are disposed at opposing faces of the main body 12. Specifically, the actuator 34 for the zoom lens (group) 14 is disposed on an upper face of the main body 12 in FIG. 1, and the actuator 36 for the zoom lens (group) 16 is disposed on a lower face of the main body 12. Though a description of the actuator 34 shall be provided below, the actuator 36 is arranged in the same manner.

Figure 4:
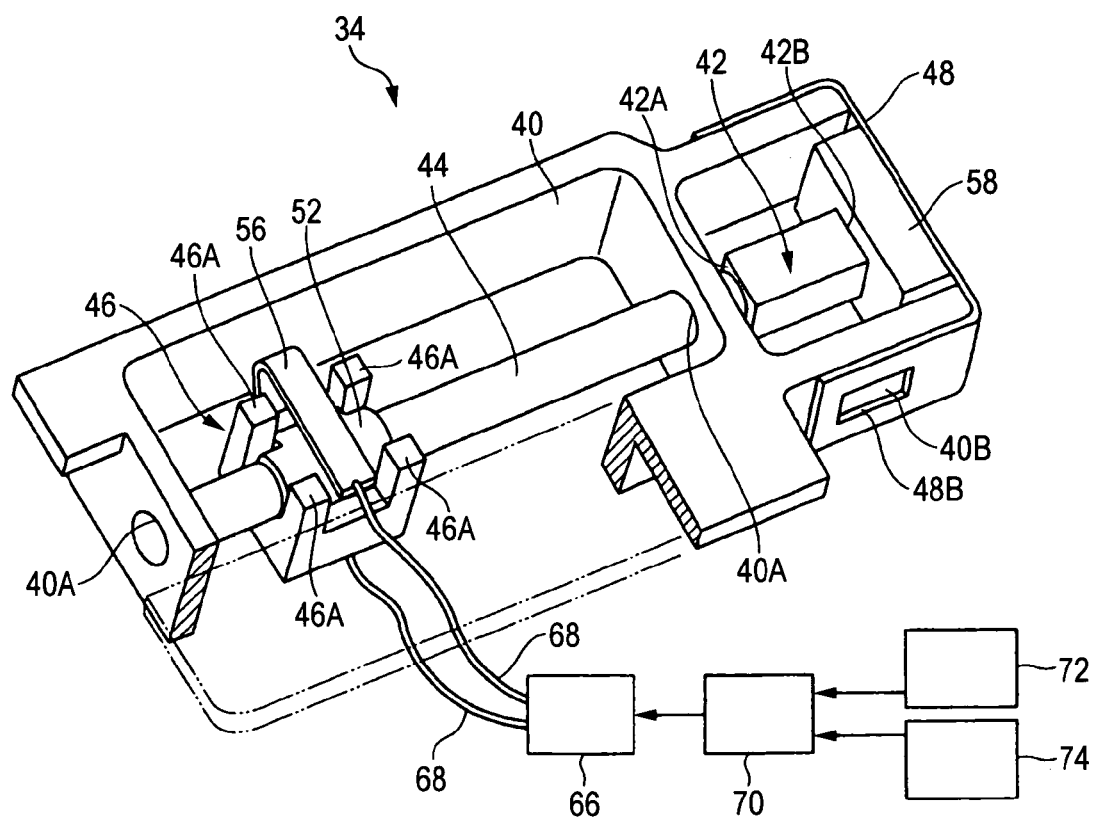
FIG. 4 is a schematic diagram of an arrangement of the actuator of the first embodiment.

FIG. 4 is a perspective view of an arrangement of the actuator 34. As shown in this figure, the actuator 34 is mainly arranged from a fixed frame 40, a piezoelectric element (corresponding to being an electro-mechanical conversion element) 42, a driving shaft (corresponding to being a driving frictional member) 44, a connecting block (corresponding to being a driven member) 46, and a mounting bracket (corresponding to being an elastic supporting member) 48, and the fixed frame 40 is fixed to the main body 12 of the lens device 10 of FIG. 1.

The piezoelectric element 42 is layered along the optical axis P direction (hereinafter, "driving direction") of the lens device 10 and is arranged to deform (extend or contract) along the driving direction upon application of voltage. Thus with the piezoelectric element 42, end faces 42A and 42B in the longitudinal direction become displaced along the driving direction upon application of voltage.

Of the end faces 42A and 42B of the piezoelectric element 42, a base end of the driving shaft 44 is affixed to one end face 42A, and a weight member 58, formed of a soft material, is fixed by adhesion onto the other end face 42B.

By applying a load to the end face 42B, the weight member 58 prevents the end face 42B from becoming displaced more than the end face 42A. Thus as the weight member 58, a member that is greater in weight than the driving shaft 44 is preferable. Also, the weight member 58 is formed of a material with a Young's modulus less than that of each of the piezoelectric element 42 and the driving shaft 44 and, for example, is formed of a material with a Young's modulus of no more than 300 MPa. For example, the weight member 58 is formed of urethane rubber or urethane resin, etc., and is manufactured by mixing a powder of tungsten or other metal into the rubber or resin to make the specific gravity high. To achieve compact size, the specific gravity of the weight member 58 is preferably made as high as possible and is set, for example, to approximately 8 to 12.

The weight member 58 is adhered onto the mounting bracket 48 at the side opposite the piezoelectric element 42. The mounting bracket 48 is formed by bending a thin metal plate to a square C-shape and openings 48B are formed at the bent portions at both ends. The mounting bracket 48 is mounted onto the fixed frame 40 by fitting protrusions 40B of the fixed frame 40 into the openings 48B. The piezoelectric element 42 is thus supported on the fixed frame 40 via the weight member 58 and the mounting bracket 48.

The piezoelectric element 42 that is supported as described above is supported in a manner in which the end face 42B can be displaced along the driving direction. That is, the end face 42B can be displaced along the driving direction by the expansion or contraction of the soft weight member 58 or the warping of the mounting bracket 48. By thus supporting so that the end face 42B of the piezoelectric element 42 can be displaced, resonant vibration of the device arrangement system within a driving frequency range can be prevented to enable stable drive control to be performed.

Meanwhile, the driving shaft 44 which is affixed to the end face 42A of the piezoelectric element 42 is formed to a rectangular columnar shape and is positioned so that its central axis lies along the driving direction. The driving shaft 44 is inserted through two holes 40A formed in the fixed frame 40 and is thereby guided and supported in a manner enabling sliding along the central axis direction. As the material of the driving shaft 44, a graphite crystal composite, such as carbon graphite, in which graphite crystals are firmly compounded is used.

A connecting block 46 is engaged with the driving shaft 44. The connecting block 46 is connected to the above-described holding frame 18 of the zoom lens 14 and is supported in a manner enabling sliding along the optical axis P direction (the driving direction) along with the holding frame 18. The connecting block 46 is formed to a rectangular shape, and upwardly protruding protrusions 46A are respectively provided on the four corners thereof.

Figure 5:
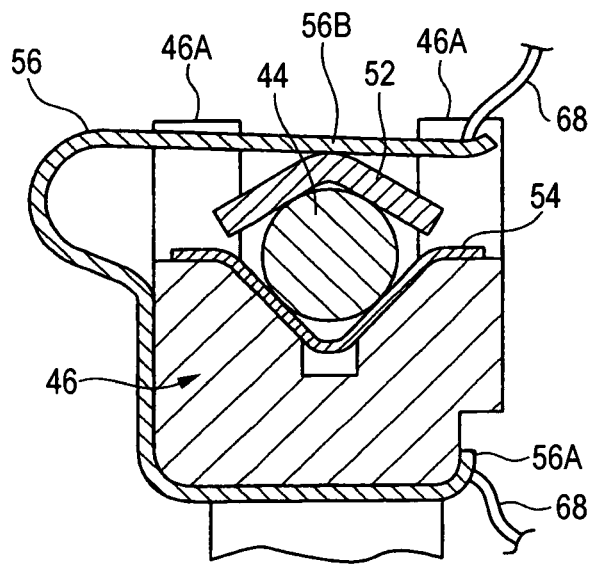
FIG. 5 is a sectional view of a connecting portion of a driving shaft and a connecting block.

FIG. 5 is a sectional view of the connecting portion of the connecting block 46 and the driving shaft 44. As shown in this figure, a first sliding member 52 and a second sliding member 54 are provided at the connecting portion of the connecting block 46 and the driving shaft 44. The first sliding member 52 is disposed at an upper side of the driving shaft 44, and the second sliding member 54 is disposed at a lower side of the driving shaft 44. The first sliding member 52 and the second sliding member 54 are members that are provided to obtain a stable frictional force between the connecting block 46 and the driving shaft 44, and are formed, for example, from stainless steel.

The second sliding member 54 is formed to a V-shape and is fixed to the connecting block 46. Meanwhile, the first sliding member 52 is formed to an inverted V-shape and is positioned in a region surrounded by the four protrusions 46A of the connecting block 46. The first sliding member 52 is notched at its respective corner portions in accordance with the protrusions 46A of the connecting block 46. Thus when the first sliding member 52 is positioned in the region surrounded by the protrusions 46A, the first sliding member 52 is prevented from falling off from the connecting block 46.

A pressing spring 56 is mounted onto the connecting block 46. The pressing spring 56 is arranged by bending a metal plate, formed of a shape memory alloy, and is mounted onto the connecting block 46 by hitching a pawl 56A onto a lower portion of the connecting block 46. The pressing spring 56 also has a pressing portion 56B that is positioned on an upper side of the first sliding member 52 and is arranged to urge the first sliding member 52 downward by the pressing portion 56B. The driving shaft 44 is thereby put in a state of being sandwichingly pressed by the first sliding member 52 and the second sliding member 54, and the connecting block 46 is frictionally engaged with the driving shaft 44 via the first sliding member 52 and the second sliding member 54. The frictional force between the connecting block 46 and the driving shaft 44 is set so that when drive pulses of a gradual voltage variation is applied to the piezoelectric element 42, the frictional force is greater than the driving force, and when drive pulses of a rapid voltage variation is applied to the piezoelectric element 42, the frictional force is less than the driving force.

A heating device 66 is electrically connected to the pressing spring 56. That is, lead wires 68 are connected to both ends of a pressing spring 56, and these lead wires 68 are connected to the heating device 66. The heating device 66 is arranged to apply a predetermined voltage and thereby pass an electric current through the pressing spring 56 and heat the pressing spring 56. The pressing spring 56 is arranged from a shape memory alloy as mentioned above, and deforms to a memorized shape when heated to a predetermined temperature or higher. Specifically, the pressing spring 56 is arranged so that when it is heated, the pressing spring 56 deforms in a manner such the pressing portion 56B, shown in FIG. 5, becomes lowered and the frictional force (sliding resistance) between the first sliding member 52 and the driving shaft 44 and the frictional force (sliding resistance) between the second sliding member 54 and the driving shaft 44 increase. The sliding resistances in this state are preferably adjusted within a range of no less than 10 gf and no more than 30 gf and more preferably within a range of no less than 15 gf and no more than 25 gf.

The heating device 66 is connected to a controller 70, and the heating device 66 is controlled by the controller 70. The controller 70 is connected to position detectors 72 and 74, and the heating device 66 is controlled based on detection values of the position detectors 72 and 74.

The position detector 72, shown in FIG. 2, is a reflection type photointerrupter that is fitted and fixed in an opening 12A of the main body 12 (see FIG. 1). This position detector 72 is disposed opposite a plate-like reflecting portion 78, formed integral to the holding frame 18. Additionally, the position detector 72 has a light projecting portion and a light receiving portion (not shown), and is arranged so that the light projecting portion projects light toward the reflecting portion 78 and the reflected light reflected from the reflecting portion 78 is received by the light receiving portion, which detects the light amount of the reflected light.

Figure 7:
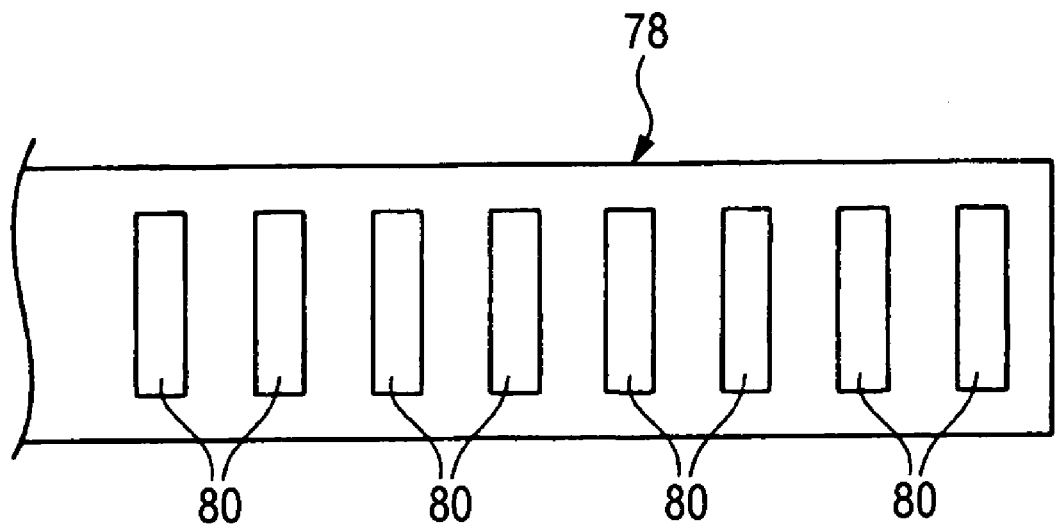
FIG. 7 is a front view of an arrangement of a reflecting portion.
Figure 8:
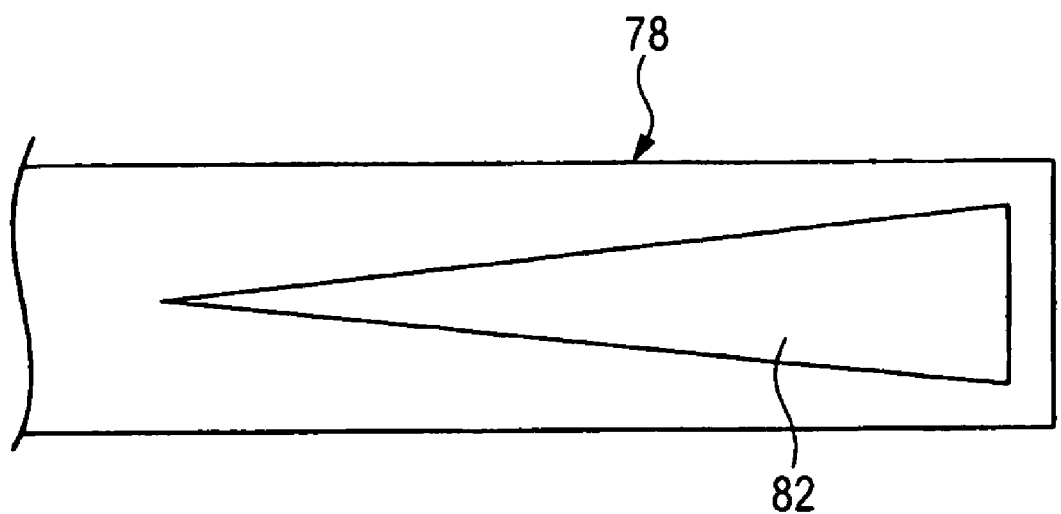
FIG. 8 is a front view of a reflecting portion of an arrangement that differs from that of FIG. 7.

As shown in FIG. 7, on the reflecting portion 78, a plurality of reflecting bodies 80 are disposed at fixed intervals along the driving direction. Thus when the actuator 34 is driven and the reflecting portion 78 moves along the optical axis P direction, the light amount received by the light receiving portion of the position detector 72 changes and the movement amount of the reflecting portion 78 (that is, the movement amount of the holding frame 18) can thereby be detected. The arrangement of the reflecting portion 78 is not restricted to that of the embodiment described above, and it is sufficient that the reflecting portion 78 have an arrangement with which the reflection amount changes when the reflecting portion 78 is moved in the driving direction. Thus for example, a triangular reflecting body 82 may be disposed as shown in FIG. 8.

Meanwhile, the position detector 74 is a transmitting type photoreflector and is fixed to the main body 12 (see FIG. 1). An upper portion of the position detector 74 is divided into two portions with one being a light projecting portion 74A and the other being a light receiving portion 74B. The position detector 74 is arranged so that the light projecting portion 74A projects light toward the light receiving portion 74B and the light receiving portion 74B receives this light and detects the received light amount.

A plate-like light blocking portion 76, formed integral to the holding frame 18, is inserted into and drawn out from in between the light projecting portion 74A and the light receiving portion 74B. That is, when the actuator 34 is driven and the holding frame 18 is moved along the optical axis P direction, the light blocking portion 76 is inserted into and drawn out from in between the light projecting portion 74A and the light receiving portion 74B of the photointerrupter 74. The amount of light received by the light receiving portion 74B thus varies and that the light blocking portion 76 has been inserted between the light projecting portion 74A and the light receiving portion 74B can be detected. That the holding frame 18 has moved to a reference position can thus be detected.

Thus by the reference position of the holding frame 18 being detected by the position detector 74 and the moving amount of the holding frame 18 being detected by the position detector 72, the position of the holding frame 18 can be accurately determined.

The controller 70 controls the heating device 66 according to the detection values of the position detectors 72 and 74 (that is, the position of the holding frame 18 or the connecting block 46). For example, when the connecting block 46 is positioned near a base end or near a front end of the driving shaft 44, current is passed through the pressing spring 56 to heat the pressing spring 56 and thereby make the pressing spring 56 deform to the memorized shape. The urging force due to the pressing spring 56 is thereby increased and the frictional forces between the driving shaft 44 and the first sliding member 52 and the second sliding member 54 increase. Thus even when the connecting block 46 is positioned at the base end or front end of the driving shaft 44, an adequate moving distance, movement speed, and thrust can be secured for the connecting block 46.

Figure 6A:
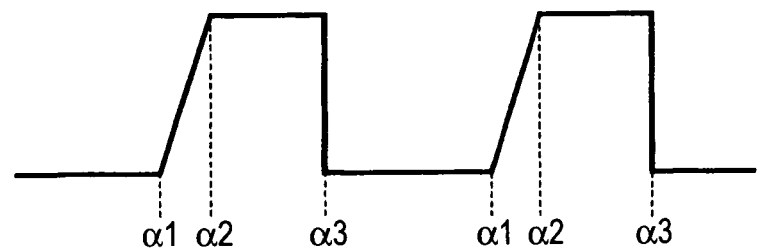
FIG. 6 shows diagrams of examples of voltage drive pulses that are applied to a piezoelectric element.
Figure 6B:
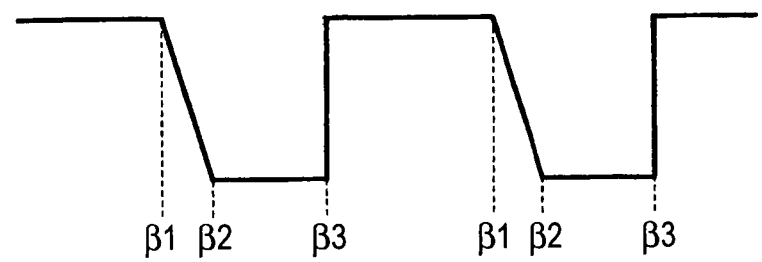

The voltages of the drive pulses shown in FIGS. 6A and 6B are applied to the piezoelectric element 42. FIG. 6A shows the drive pulses for moving the connecting block 46 of FIG. 4 in the left direction, and FIG. 6B shows the drive pulses for moving the connecting block 46 of FIG. 4 in the right direction.

In the case of FIG. 6A, substantially sawtooth-like drive pulses, each of which gradually rises from a time $\alpha1$ to a time $\alpha2$ and rapidly drops at a time $\alpha3$, are applied to the piezoelectric element 42. Thus from the time $\alpha1$ to the time $\alpha2$, the piezoelectric element 42 gradually extends. Because in this process, the driving shaft 44 moves at a gradual speed, the connecting block 46 moves along with the driving shaft 44. The connecting block 46 of FIG. 4 can thereby be moved in the left direction. At the time $\alpha3$, because the piezoelectric element 42 rapidly contracts, the driving shaft 44 moves in the right direction. Because in this process, the driving shaft 44 rapidly moves, the connecting block 46 remains stopped at the same position due to inertia and just the driving shaft 44 moves. Thus by repeatedly applying the sawtooth-like drive pulses shown in FIG. 6A, the connecting block 46 of FIG. 4 is made to repeat movement in the left direction and stoppage, and can thus be moved in the left direction.

In the case of FIG. 6B, substantially sawtooth-like drive pulses, each of which gradually drops from a time $\beta1$ to a time $\beta2$ and rapidly rises at a time $\beta3$, are applied to the piezoelectric element 42. Thus from the time β1 to the time β2, the piezoelectric element 42 gradually contracts. Because in this process, the driving shaft 44 is displaced at a gradual speed, the connecting block 46 moves along with the driving shaft 44. The connecting block 46 of FIG. 4 can thereby be moved in the right direction. At the time β3, because the piezoelectric element 42 rapidly extends, the driving shaft 44 moves in the left direction. Because in this process, the driving shaft 44 rapidly moves, the connecting block 46 remains stopped at the same position due to inertia and just the driving shaft 44 moves. Thus by repeatedly applying the sawtooth-like drive pulses shown in FIG. 6B, the connecting block 46 of FIG. 4 is made to repeat movement in the right direction and stoppage, and can thus be moved in the right direction.

The actions of the actuator 34 arranged as described above shall now be described.

By driving the actuator 34 as described above, the connecting block 46 and the holding frame 18 are moved along the driving shaft 44. In this process, with the related-art actuator, the moving distance, moving speed, and thrust of the connecting block 46 greatly varies as the connecting block 46 moves.

Figure 10:
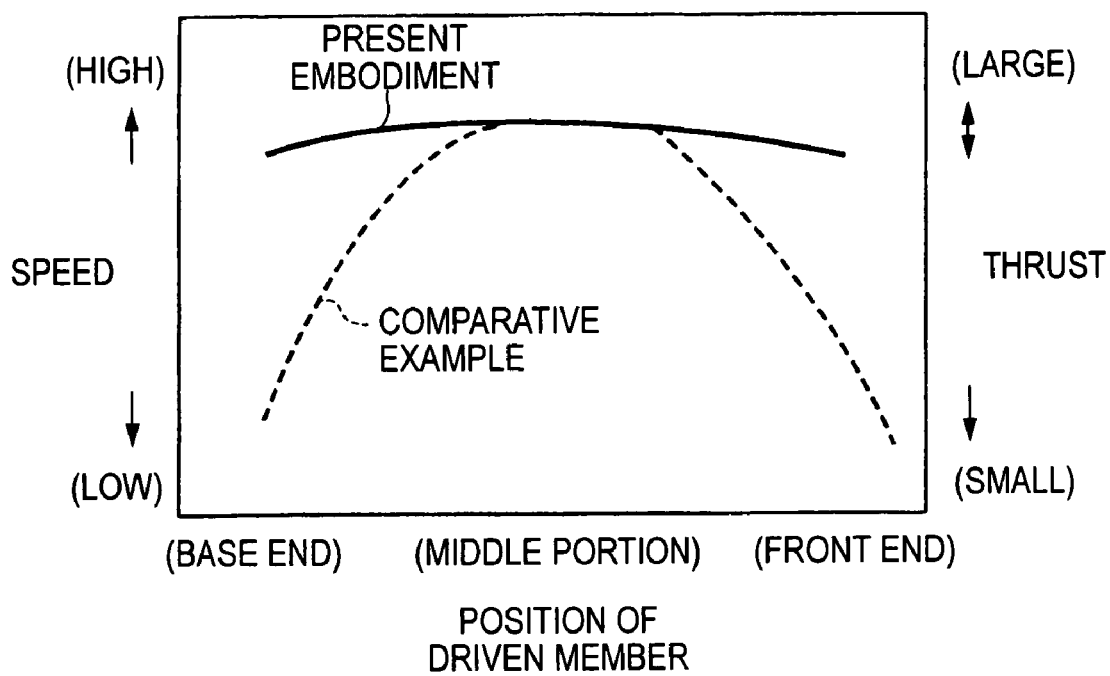
FIG. 10 is a diagram of relationships between a position of a driven member along the driving shaft and moving speed and thrust.

FIG. 10 shows a relationship between the position of the driving shaft 44 and the moving speed and the thrust of the connecting block 46. With a comparative example shown in this figure, a fixed urging force is applied by the pressing spring 56 regardless of the position of the connecting block 46.

As shown in FIG. 10, with the comparative example with which a fixed urging force is applied, the speed and thrust of the connecting block 46 decrease at a base end and a front end of the driving shaft 44, and the speed and thrust improve at a central portion of the driving shaft 44. Because with the related-art device, the speed and thrust vary according to the position of the connecting block 46, stable drive control cannot be performed. As a cause, it is considered that when the piezoelectric element 42 is made to extend or contract by applying pulse-form voltages to the piezoelectric element 42, the driving shaft 44 undergoes minute torsion or warping and the entirety of the driving shaft 44 is not uniformly displaced.

Thus with the present embodiment, the position of the connecting block 46 is detected and the pressing spring 56 is heated and deformed to adjust the urging force due to the pressing spring 56 according to the detection value. Specifically, the pressing spring 56 is heated and deformed to increase the urging force of the pressing spring 56 when the connecting block 46 is positioned near the front end or the base end of the driving shaft 44. The frictional force between the connecting block 46 and the driving shaft 44 is thereby increased and an adequate moving speed and thrust are secured for the connecting block 46. As shown in FIG. 10, because even when the connecting block 46 is positioned at the front end or the base end of the driving shaft 44, substantially the same moving speed and thrust as those obtained when the connecting block 46 is positioned at a central portion of the driving shaft 44 are obtained, stable drive control that is not dependent on the position of the connecting block 46 can be performed.

Though with the above-described embodiment, the pressing spring 56 is heated and adjusted in urging force when the connecting block 46 is positioned near the front end or the base end of the driving shaft 44, the timing of adjustment of the urging force (that is, at which positions along the driving shaft 44 the pressing spring 56 is to be heated) is not restricted to that of the above-described embodiment. For example, the urging force may be adjusted only when the connecting block 46 is positioned at the front end of the driving shaft 44. Also, the pressing spring 56 may be heated and adjusted in urging force when the connecting block 46 is positioned at the central portion of the driving shaft 44.

Also, though with the above-described embodiment, the pressing spring 56 is made to memorize a shape such that the urging force increases when the pressing spring 56 is heated, the pressing spring 56 may oppositely be made to memorize a shape such that the urging force decreases (that is, the urging force disappears) upon heating.

Also, though with the above-described embodiment, a unidirectional shape memory alloy that deforms to the memorized shape when the pressing spring 56 is heated is used, the present invention is not restricted thereto, and a bidirectional shape memory alloy that deforms to another shape when cooled may be used instead.

Also, though with the above-described embodiment, the urging section is arranged from a pressing spring 56 formed of a shape memory alloy, the arrangement of the urging section is not restricted thereto and, for example, the urging section may be arranged from a spring formed of a shape memory alloy or a shape memory resin.

Furthermore, though with the above-described embodiment, the position detector 72, arranged from a photointerrupter, and a position detector 74, arranged from a photoreflector, are used as the position detecting section for the holding frame 18 (that is, the connecting block 46), just one of either may be used or a position detecting section of another arrangement may be employed.

Figure 9:
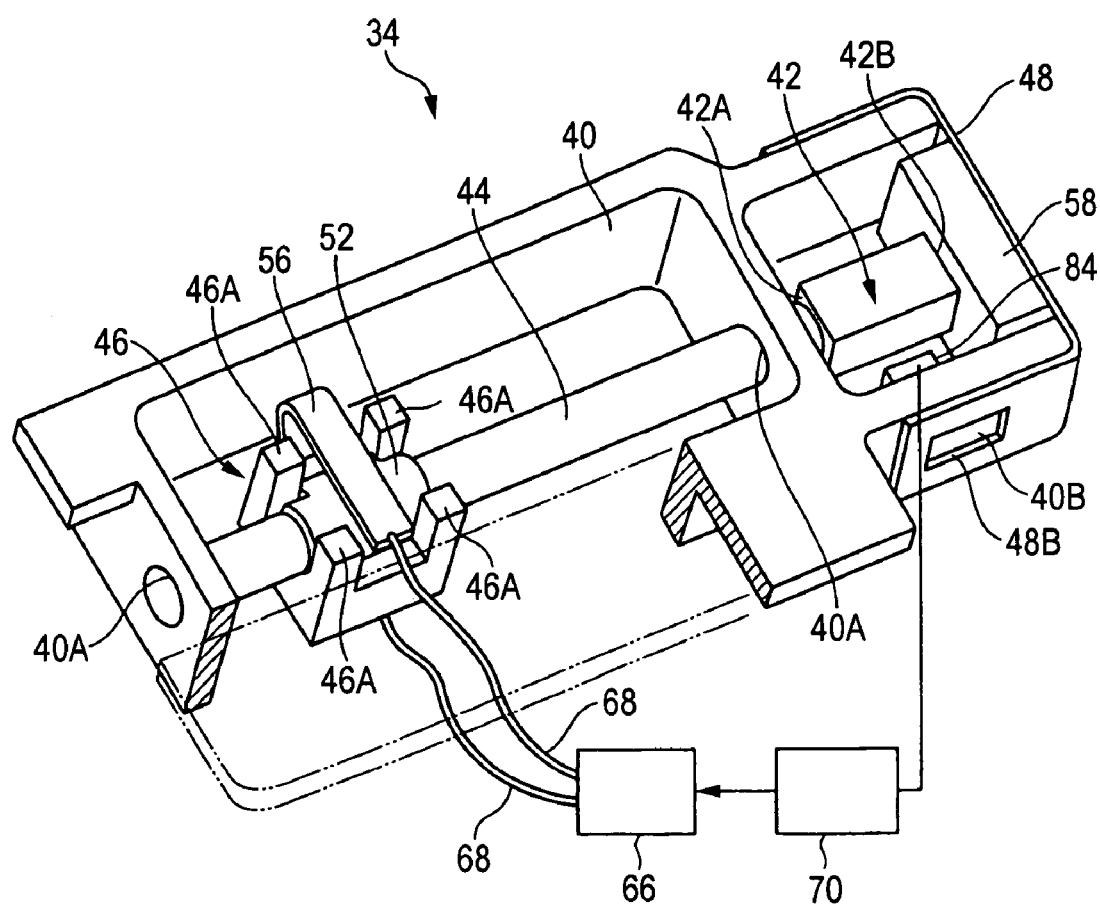
FIG. 9 is a schematic diagram of an arrangement of an actuator of a second embodiment.

A second embodiment of an actuator 34 according to the present invention shall now be described. The actuator 34 according to the second embodiment shown in FIG. 9 is an example in which the urging force is adjusted according to the operating environment and is equipped with a temperature sensor 84 that measures the temperature inside a fixed frame 40. As the temperature sensor 84, for example, a thermocouple is used, and a front end thereof is disposed near a piezoelectric element 42. This temperature sensor 84 is connected to a controller 70, and the controller 70 controls a heating device 66 in accordance with detection values of the temperature 84 to adjust the temperature of a pressing spring 56. The pressing spring 56 thus deforms and the urging force due to the pressing spring 56 is adjusted according to the temperature of the surroundings in which the actuator 34 is installed. The temperature at which the pressing spring 56 deforms to the memorized shape and the memorized shape are set based on experimental results and are set so that even when the temperature of the operating environment varies, the connecting block 46 moves at a fixed moving speed or thrust. For example, settings are made so that the urging force due to the pressing spring 56 increases as the temperature decreases.

Figure 11:
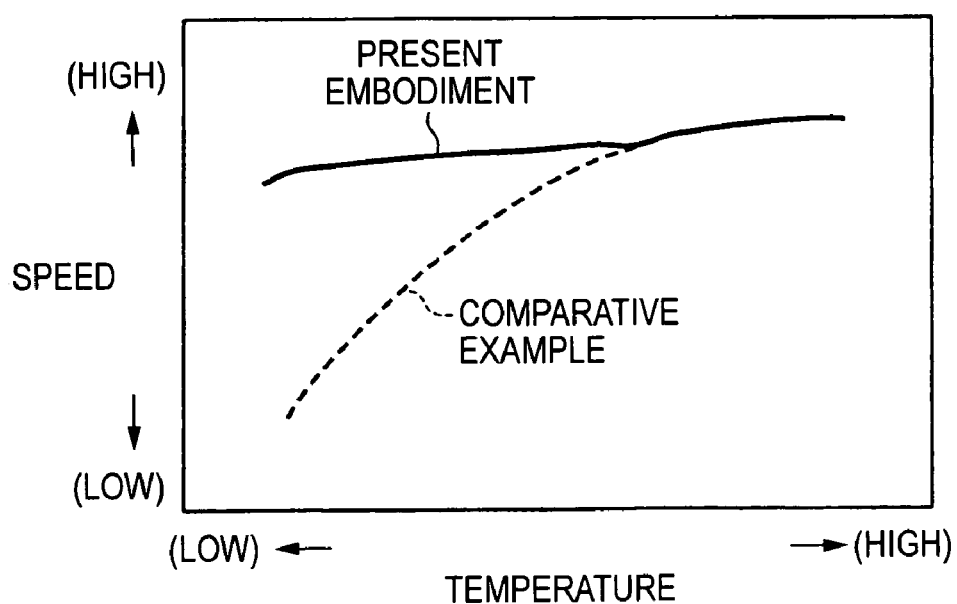
FIG. 11 is a diagram of a relationship between operating environment and moving speed.

With the second embodiment, because the pressing spring 56 is deformed by heating to adjust the urging force due to the pressing spring 56 according to the temperature of the operating environment, a fixed moving speed or thrust can be constantly maintained regardless of the temperature. For example, FIG. 11 shows a relationship of the temperature of the operating environment and the moving speed of the connecting block 46. With a comparative example shown in this figure, a constant urging force is applied by a pressing spring 56 regardless of the operating environment. As can be understood from this comparative example, when a fixed urging force is applied, the speed of a connecting block 46 decreases as the temperature decreases. Therefore, stable driving control cannot be performed. On the other hand, with the present embodiment, because the urging force due to the pressing spring 56 is made to increase as the temperature decreases, an adequate speed can be maintained even when the temperature decreases. With the present embodiment, because the speed of the connecting block 46 can thus be kept substantially fixed, stable drive control that is not dependent on the operating environment can be performed.

Though with the second embodiment, the urging force is adjusted so that the moving speed of the connecting block 46 is substantially fixed, the urging force may instead be adjusted so that the thrust of the connecting block 46 is substantially fixed. In this case, settings are made so that the urging force increases as the temperature increases.

Also, though with the second embodiment, the urging force is adjusted according to temperature, another operating environment parameter, such as humidity or atmospheric pressure, may be measured and the urging force may be adjusted based on the measured value.

Also, though the urging force is adjusted according to the position of the connecting block 46 in the above-described first embodiment, and the urging force is adjusted according to the operating environment in the second embodiment, arrangements may be made to adjust the urging force based on both the position of the connecting block 46 and the operating environment.

Furthermore, with the first and second embodiments, the urging force may be adjusted in multiple stages of two stages or three or more stages or may be adjusted so as to vary in a continuous manner.

Though the material of the weight member 58 in the present invention is not restricted to the above-described soft material and a hard material may be used, the use of a soft material is preferable from the following points. That is, by using the weight member 58 formed of a soft material, the resonance frequency of the system arranged from the piezoelectric element 42, the driving frictional member 44, and the weight member 58 is made low. By the resonance frequency being made low, effects due to scattering among arrangements of the piezoelectric element 42, the driving driving shaft 44, and the weight member 58 are lessened, and a stable driving force can be obtained. Also, by the resonance frequency $f_0$ being made low, the driving frequency f can be readily set in a vibration-proof region of $f \geq 2^{1/2} \cdot f_0$ to lessen the effects of resonant vibration and enable a stable driving force to be obtained. Because the driving force due to extension and contraction of the piezoelectric element 42 is thereby reliably transmitted to the driven member, the driven member can be accurately moved in the extension/contraction direction of the piezoelectric element 42. Also, because the effects due to resonant vibration are lessened by the resonance frequency $f_0$ being made low, the supporting position and supporting method of the actuator can be arbitrarily selected, and for example, the actuator can be supported at the end face 42A or a side face of the piezoelectric element 42 and a side face or an end face of driving shaft 44.

With the actuator according to the present invention, because the urging force of the urging section can be adjusted to adjust the frictional force between the driven member and the driving frictional member, the driven member can be driven over a fixed moving distance at a fixed moving speed and thrust, and stable drive control can be performed.

The entire disclosure of each and every foreign patent application from which the benefit of foreign priority has been claimed in the present application is incorporated herein by reference, as if fully set forth.

What is claimed is:

1. An actuator comprising:
   an electro-mechanical conversion element;
   a driving frictional member mounted onto one side in an extension/contraction direction of the electro-mechanical conversion element;
   a driven member frictionally engaged with the driving frictional member;
   a first sliding member frictionally engaged with the driving frictional member;
   an urging section that urges the driven member to frictionally engage the driven member with the driving frictional member; and
   an urging force adjusting section that adjusts an urging force of the urging section.

2. An actuator comprising:
   an electro-mechanical conversion element;
   a driving frictional member mounted onto one side in an extension/contraction direction of the electro-mechanical conversion element;
   a driven member frictionally engaged with the driving frictional member;
   an urging section that urges the driven member to frictionally engage the driven member with the driving frictional member;
   an urging force adjusting section that adjusts an urging force of the urging section;
   a position detecting section that detects a position of the driven member; and
   a controlling section that controls the urging force adjusting section based on a detection value of the position detecting section.

3. An actuator comprising:
   an electro-mechanical conversion element;
   a driving frictional member mounted onto one side in an extension/contraction direction of the electro-mechanical conversion element;
   a driven member frictionally engaged with the driving frictional member;
   an urging section that urges the driven member to frictionally engage the driven member with the driving frictional member;
   an urging force adjusting section that adjusts an urging force of the urging section;
   an ambient environmental condition measuring section that measures an ambient environmental condition; and
   a controlling section that controls the urging force adjusting section based on measurement values of the ambient environmental condition measuring section.

4. An actuator comprising:
   an electro-mechanical conversion element;
   a driving frictional member mounted onto one side in an extension/contraction direction of the electro-mechanical conversion element;
   a driven member frictionally engaged with the driving frictional member;
   an urging section that urges the driven member to frictionally engage the driven member with the driving frictional member;
   an urging force adjusting section that adjusts an urging force of the urging section; and
   the urging force adjusting section is a heating device that passes an electric current through the urging section.

5. The actuator according to claim 1,
   wherein a holding frame of a zoom lens is mounted onto the driven member.

6. The actuator according to claim 1, wherein the urging force adjusting section causes a change in a frictional force between the first sliding member and the driving frictional member.

7. The actuator according to claim 6, further comprising: a second sliding member frictionally engaged with the driving frictional member.

8. The actuator according to claim 7, wherein the urging force adjusting section causes a change in a frictional force between the second sliding member and the driving frictional member.

9. The actuator according to claim 3, wherein the ambient environmental condition is at least one of temperature, humidity, and atmospheric pressure.

10. The actuator according to claim 4,
wherein the urging section is a plate spring, and
the urging force adjusting section passes the electric current through the plate spring to heat the plate spring.

11. The actuator according to claim 10,
wherein the plate spring comprises a shape memory alloy.

* * * * *